US009043652B2

(12) United States Patent  (10) Patent No.: US 9,043,652 B2
Arndt et al.  (45) Date of Patent: May 26, 2015

(54) USER-COORDINATED RESOURCE RECOVERY

(71) Applicant: International Business Machines Corporation, Armonk, NY (US)

(72) Inventors: Karla K. Arndt, Rochester, MN (US); James M. Caffrey, Woodstock, NY (US); Juliet C. Candee, Danbury, CT (US); Aspen L. Payton, Byron, MN (US); William R. Richardson, Fishkill, NY (US)

(73) Assignee: International Business Machines Corporation, Armonk, NC (US)

( * ) Notice: Subject to any disclaimer, the term of this patent is extended or adjusted under 35 U.S.C. 154(b) by 288 days.

(21) Appl. No.: 13/655,520

(22) Filed: Oct. 19, 2012

(65) Prior Publication Data

US 2013/0091385 A1    Apr. 11, 2013

Related U.S. Application Data

(63) Continuation of application No. 13/270,649, filed on Oct. 11, 2011, now Pat. No. 8,732,525.

(51) Int. Cl.
*G06F 11/07*  (2006.01)
*G06F 11/34*  (2006.01)

(52) U.S. Cl.
CPC ........ *G06F 11/0754* (2013.01); *G06F 11/3447* (2013.01); *G06F 11/3466* (2013.01); *G06F 2201/815* (2013.01)

(58) Field of Classification Search
CPC . G06F 11/008; G06F 11/0709; G06F 11/079; G06F 11/3409; G06F 11/3442; G06F 11/3447; G06F 11/3452; G06F 11/3461; G06F 17/30595; G06F 2201/81; G06F 2201/87; G06F 8/20; G06F 9/455; G06F 9/505
USPC ........................................................... 714/26
See application file for complete search history.

(56) References Cited

U.S. PATENT DOCUMENTS

| 6,321,374 | B1 * | 11/2001 | Choy ............................. 717/106 |
| 7,711,987 | B2 * | 5/2010 | Agarwal et al. ................. 714/26 |
| 7,725,777 | B2 | 5/2010 | Gehman et al. |
| 7,877,250 | B2 * | 1/2011 | Oslake et al. .................... 703/22 |
| 2012/0066687 | A1 * | 3/2012 | Briscoe et al. ................ 718/104 |
| 2012/0203536 | A1 * | 8/2012 | Gangemi et al. ................. 703/22 |
| 2013/0055404 | A1 * | 2/2013 | Khalili ............................ 726/25 |

\* cited by examiner

*Primary Examiner* — Marc Duncan
(74) *Attorney, Agent, or Firm* — Cantor Colburn LLP; William A. Kinnaman, Jr.

(57) ABSTRACT

A computing system resource recovery method can include identifying a resource manager associated with a computing transaction, classifying the computing transaction to determine a predetermined metric, measuring an actual metric of the computing transaction, comparing the predetermined metric to the actual metric to detect abnormal behavior in the transaction and modeling the abnormal behavior to determine how the resource manager is affected by the abnormal behavior.

6 Claims, 6 Drawing Sheets

USER-COORDINATED RESOURCE RECOVERY

CROSS-REFERENCE TO RELATED APPLICATION

This application is a continuation of U.S. patent application Ser. No. 13/270,649, filed Oct. 11, 2011, now U.S. Pat. No. 8,732,525, the disclosure of which is incorporated by reference herein in its entirety.

BACKGROUND

The present invention relates to operating system resource management, and more specifically, to systems and methods for detecting soft failures affecting operating system resource managers.

Soft failures or "sick, but not dead incidents" are a class of failure in complex computing systems such as a multi-mainframe operating system, which can't be detected by the stateless individual components. Soft failures are typically caused by rare combinations or sequences of legal events. Current techniques implement existing historical data and mathematical modeling to predict normal behavior and exceptions are issued when there is a significant deviation from normal, thereby indicating a soft failure.

The problem with the current approach to detecting soft failures is that tools use existing historical data already captured for some other use which lacks the necessary granularity, or require a change in the behavior of a component by inserting an agent that destroys the statelessness of the component. Furthermore, there is a need to detect not only when the component is experiencing a soft failure, but when specific transactions being processed by the component experience a soft failure. A soft failure within a transaction can create several issues including but not limited to: 1) a class of transactions which never completes; 2) a class of transactions which never runs to successful completion; and 3) a class of transactions with excessive or unusual numbers of failures. Conventionally there is no way to externally monitor for soft failures related to transaction processing without changing existing resource managers.

SUMMARY

Exemplary embodiments include a computing system resource recovery method, including identifying a resource manager associated with a computing transaction, classifying the computing transaction to determine a predetermined metric, measuring an actual metric of the computing transaction, comparing the predetermined metric to the actual metric to detect abnormal behavior in the computing transaction and modeling the abnormal behavior to determine how the resource manager is affected by the abnormal behavior.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments include systems and methods that externally monitor complex computing systems to detect soft failures related to transaction processing without changing the existing components (i.e., resource managers). In large distributed processing systems, layers of software called resource managers update and recover resources to maintain data integrity. For example, in z/OS, an operating system that can coordinate multiple workloads in a multi-mainframe environment (e.g., a Sysplex), and potentially on other large complex transactions processing systems, there is a layer of software (e.g., Resource Recovery Services (RRS)) which provides coordination between multiple resource managers (e.g., relational databases (DB2), Integrated Management Systems (IMS), or transactional Virtual Storage Access Method (VSAM)) when multiple resource managers must work together to provide two phase commit support for a transaction. For resource managers that are enabled to use this type of coordination service for two phase commits, this coordination provides the possibility of detecting soft failures at the transaction level. The term "two phase commits" generally refers to a distributed algorithm protocol that coordinates all processes that participate in a distributed transaction in complex computing environments, particularly in temporary "soft" failures as described herein. RRS provides valuable information, such as the duration of a transaction within a class of transactions and the success rate (percentage of commits) of the classes of transactions. In exemplary embodiments, using these metrics from resource recovery software layers (e.g., RSS) without changing the resource managers, it is possible to detect such failures as storm drains and failing classes of transactions at the transaction level for a specific resource manager as described herein. A storm drain is a specific type of soft failure where a resource manager like a database quickly rejects or fails a request, which causes the work load balancer to think that this resource manager should get more work because it is quickly servicing the request. The result of the combination of these two events is that more work is routed to the failing resource manager creating a storm drain into which all the work goes. "Failing classes of transactions" refers to unusually rare and complex transactions which never complete or transactions which have stopped working because of problems in the resource managers.

Figure 1:
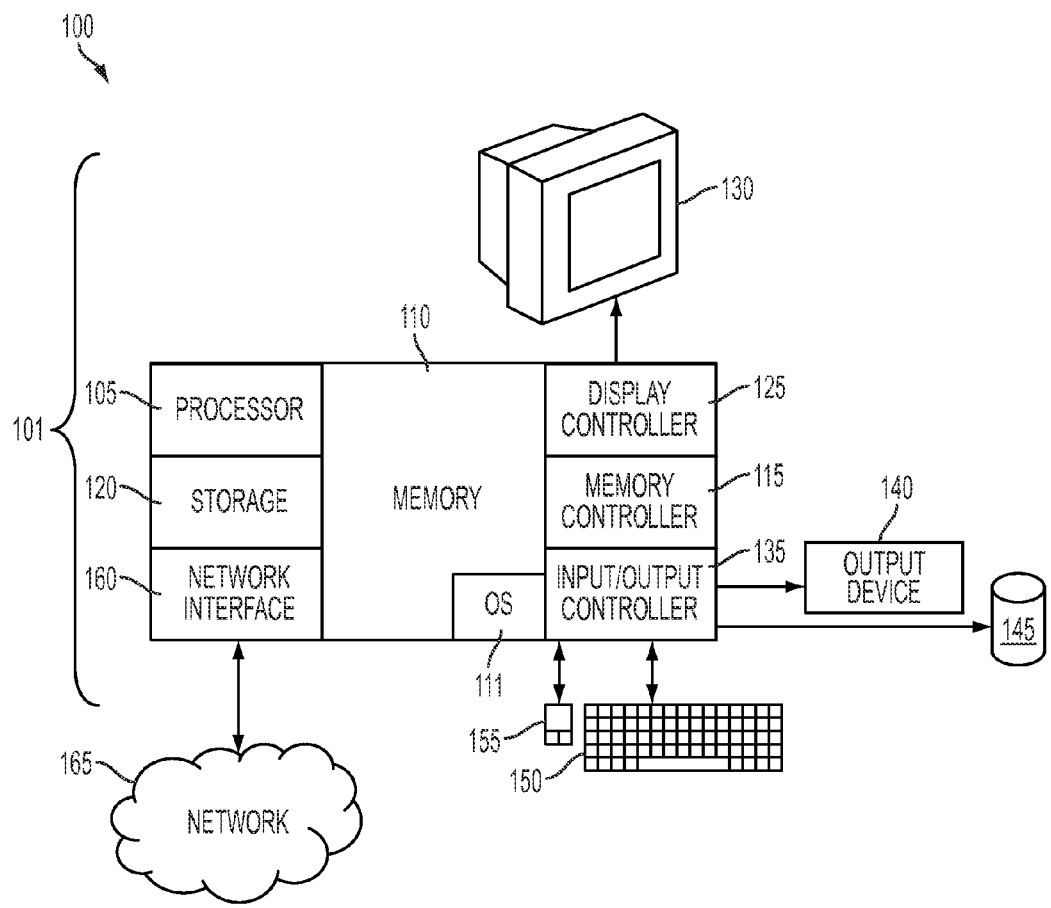
FIG. 1 illustrates an exemplary embodiment of a system for user-coordinated resource recovery.

FIG. 1 illustrates an exemplary embodiment of a system 100 for user-coordinated resource recovery. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the user-coordinated resource recovery methods described herein in accordance with exemplary embodiments and a suitable operating system (OS) 111. The OS 111 essentially controls the execution of other computer programs, such the user-coordinated resource recovery systems and methods as described herein, and provides scheduling, input-output control, file and data management, memory management, and communication control and related services.

The user-coordinated resource recovery methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the user-coordinated resource recovery methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The user-coordinated resource recovery methods described herein and the OS 111, in whole or in part, but typically the latter, are read by the processor 105, perhaps buffered within the processor 105, and then executed.

When the systems and methods described herein are implemented in software, as is shown in FIG. 1, the methods can be stored on any computer readable medium, such as storage 120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the user-coordinated resource recovery methods are implemented in hardware, the user-coordinated resource recovery methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
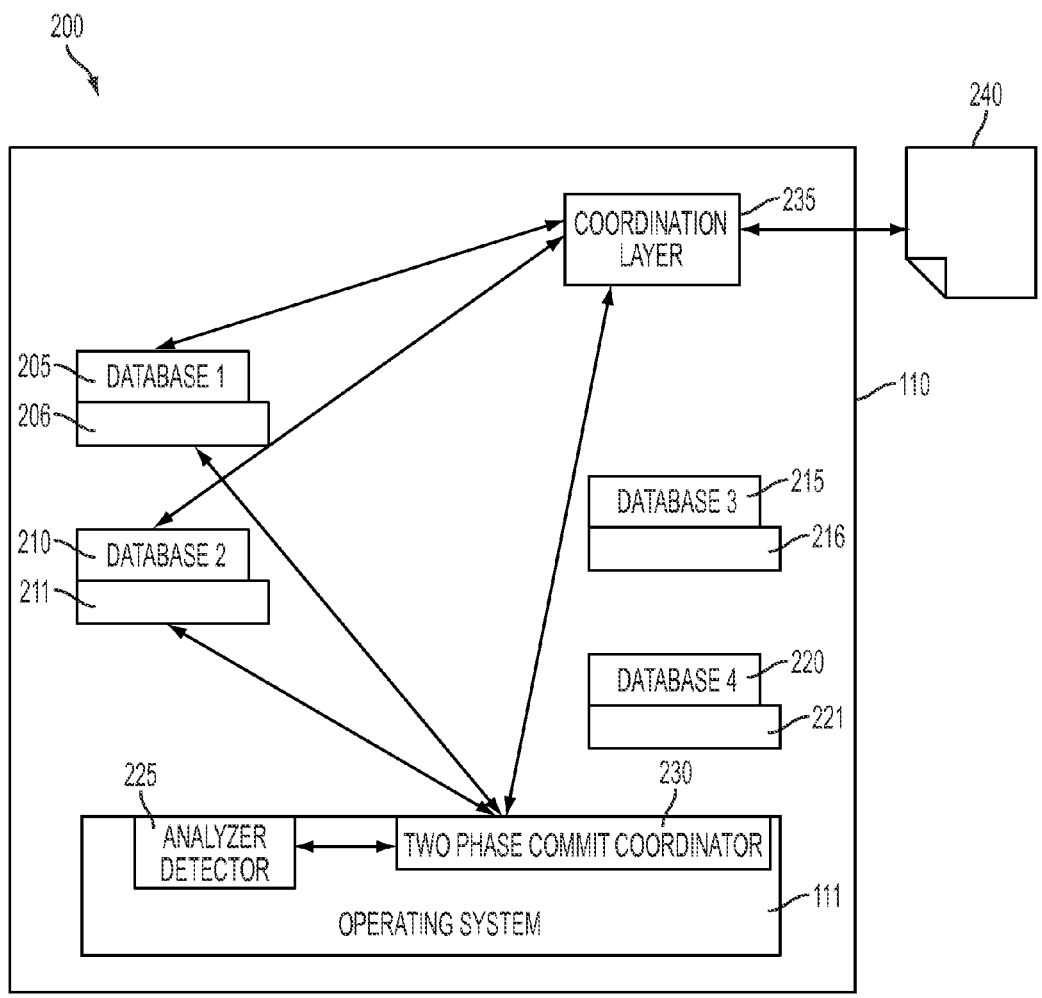
FIG. 2 illustrates a portion of the system of FIG. 1 illustrating further details.

FIG. 2 illustrates a portion 200 of the system 100 of FIG. 1 illustrating further details, including the memory 110 and the operating system 111 of FIG. 1. In exemplary embodiments, the memory can further include one or more databases 205, 210, 215, 220 and corresponding resource managers 206, 211, 216, 221. The operating system 111 can further include a resource recovery process 225 (i.e., abnormal behavior detector/analyzer (e.g., RSS)), and a two phase commit algorithm 230 as described herein. In exemplary embodiments, the memory 110 can further include an exemplary coordination layer process 235 that coordinates the two phase commit algorithm 230 and the various resource managers 206, 211, 216, 221 as described herein. The coordination layer process 235 can collect various pieces of data 240 and store them in one or more files.

As such, in exemplary embodiments, the functionality of conventional resource recovery processes is expanded in the exemplary resource recovery process 225 to monitor the behavior of the resource managers 206, 211, 216, 221 at a transaction class level by adding instrumentation to the coordination layer process 235 to capture historical data 240. In exemplary embodiments, the systems and methods described herein implement historical data 240 captured from the coordination layer process 235 to make a prediction of the expected minimum and maximum transaction durations and a prediction of the expected number of failures. As such, it can be appreciated that the coordination layer process 235 is a process external to the resource recovery process 225 without having to change the existing resource managers 206, 211, 216, 221.

The systems and methods described herein further implement a maximum transaction duration value to develop a timeout or excessive delay warning for various hardware devices (e.g., I/O devices 140, 145) that may be associated with the databases 205, 210, 215, 220. In exemplary embodiments, an algorithm for implementing the maximum duration value is captured by the two-phase commit coordinator 230 and can include: 1) sampling the behavior (i.e., response time) of the I/O devices 140, 145 using sensors which can be embedded within the operating system 111, or other external monitor; 2) recording the response time for the I/O devices 140, 145 for each time interval; 3) constructing a mathematical model which describes the behavior of the I/O devices 140, 145 over time; 4) determining if the model should be accepted (i.e., does it reflect a period during which no IO errors where detected); 5) sampling the behavior of the I/O devices 140, 145 using sensor which was monitoring response time; and 6) comparing the observed behavior to the model behavior. In exemplary embodiments, depending on the type of I/O device 140, 145, different mathematical models are needed. For example, a probability model using a binomial distribution might be appropriate, if the response time is stable over time. If the response time varies over time, then a model based on Categorical Analysis Regression Tree might be appropriate. The acceptable behavior of the I/O devices 140, 145 determines how to model its behavior. Furthermore, if the observed behavior deviates from the model behavior by a user defined value, then trigger either actions or an alert. For example, the user could trigger an alert if the observed behavior deviates by three standard deviations or the user could trigger a switch to an alternative device if the observer behavior was four times longer than the model expected.

In exemplary embodiments, the systems and methods described herein further implement a minimum transaction duration value to detect a storm drain and generate an alert to the workload manager or to another system management component.

In addition, in exemplary embodiments, the systems and methods described herein also implement a failure rate algorithm to calculate the expected number of failures. An excessive number of failures may produce a storm drain. In exemplary embodiments, the system 100 implements data 240 collected by the operating system 111 to identify critical failures during a period (e.g., in z/OS this would be SVC Dumps and SYSMDumps). For example, a failure in DB2 is indicated by SQLCODEs such as −904, which are returned to the application and are seem by RRS as a request to roll back the commit The system 100 can then record the number of critical failures during the time period (critical failure arrival rate) can be either all failures or failures of a specific type or failures with a specific priority which could be calculated from a symptom string which defines the problem, keeping only the samples from time periods when the system 100 was operating acceptably. The system 100 can then implement statistical analysis like category area regression trees to divide the historical data into categories which minimize the variation to construct a model of expected arrival rate by time. The system 100 can then implement the model to determine the expected arrival rate of critical failures at specific intervals such as but not limited to the previous hour, 24 hours ago, same time last week, and same time last month, and then use the maximum or minimum or average of these values depending on the tolerance for false positive and missed events. The system 100 can then apply the appropriate statistical technique to obtain the desired certainty that the results are different. For example, for failures, the arrival rate is usually Poisson, so the system multiplies the arrival rate times the appropriate value to obtain a threshold with the desired certainty that the value is abnormal. Then by implementing a sliding window, the system 100 can determine what the arrival rate is during the last hour and compare that value to the threshold, and if it exceeds the threshold then the system 100 issue an alert.

Figure 3:
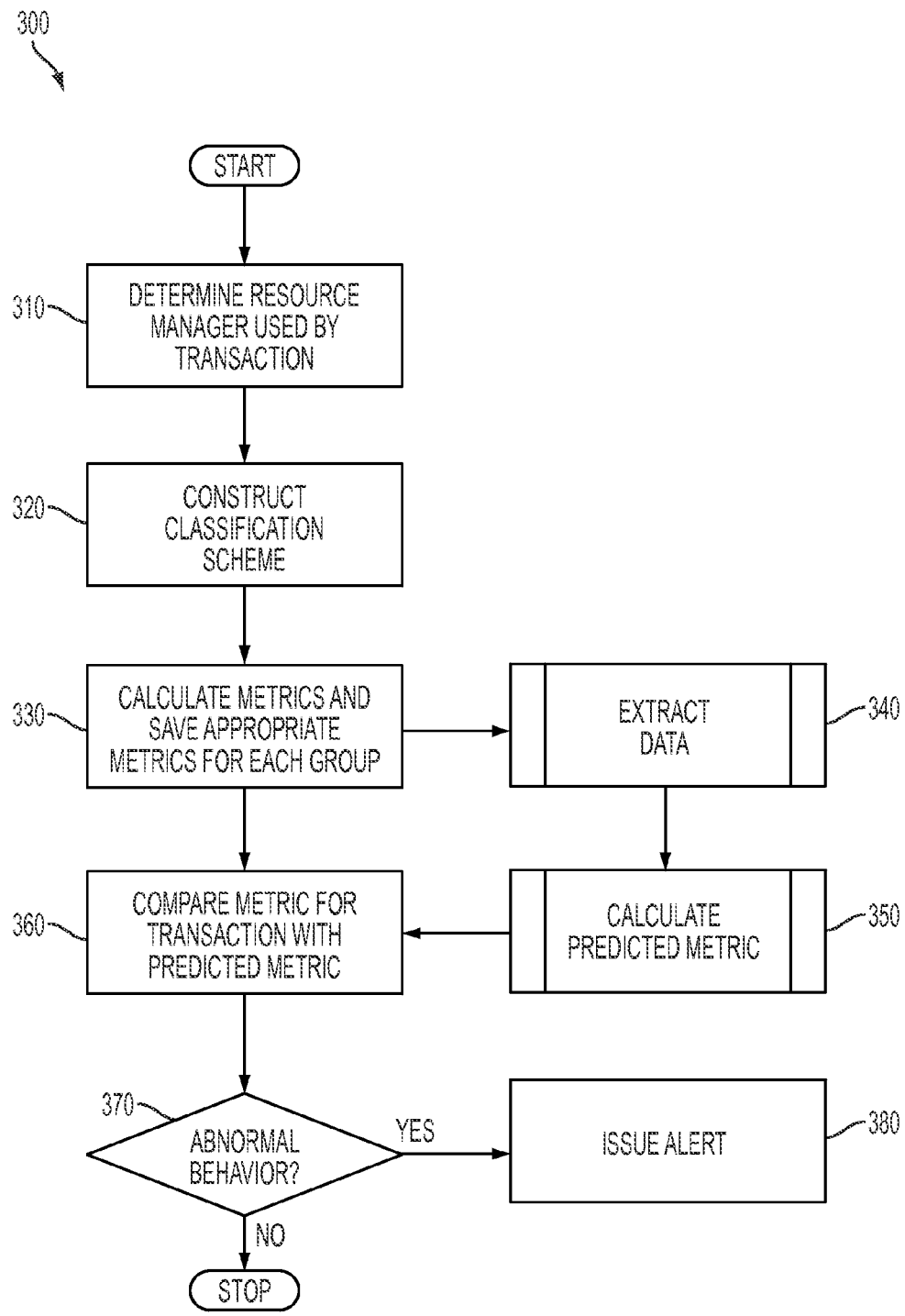
FIG. 3 illustrates a flow chart for a user-coordinate resource recovery method in accordance with exemplary embodiments.

FIG. 3 illustrates a flow chart for a user-coordinate resource recovery method 300 in accordance with exemplary embodiments. The method 300 shows the overall process for resource recovery. For a given transaction, at block 310, the system 100 determines which of the resource managers 206, 211, 216, 221 is used in the transaction. At block 320, the system 100 constructs a classification scheme, which determines how to assign transactions into particular categories as further described herein. At block 330, the system 100 calculates metrics and saves appropriate metrics for each group of transactions. At block 340, the system 100 extracts data from a given database 205, 210, 215, 220 involved in the transaction. At block 350, the system 100 calculates a predicted metric for the given transaction. At block 360, the system 100 compares the metric for the transaction with the predicted metric. At block 370, the system 100 determines if there is an abnormality based on deviations in the metric and predicted metric. If there is an abnormality determined at block 370, then the system 100 can issue an alert at block 380. If there is no abnormality determined at block 370, then the method 300 can cease until the next transaction.

In exemplary embodiments, the resource recovery process 225 that coordinates the two phase commits process 230 between the resource managers 206, 211, 216, 221 is instrumented to divide transactions into categories called "Predictive Failure Analysis (PFA) Transaction Classes" and to collect a small number of low cost metrics about the behavior of each class of transaction. Using this information, hung resource managers and storm drains can be detected. As described with the method 300 above, for example, the systems and methods described herein determine: 1) how to assign transactions to categories for modeling expected behavior without looking at the internal details of the transaction; 2) determine which simple, low cost metrics are needed to detect both storm drains and hung resource managers so that the collection of data does not impact response time of the transactions; 3) how to model the behavior of transactions without needing to know the underlying statistical distribution of transaction response times; and 4) how to use the two phase commit coordination software to detect storm drains and hung resource managers.

Figure 4:
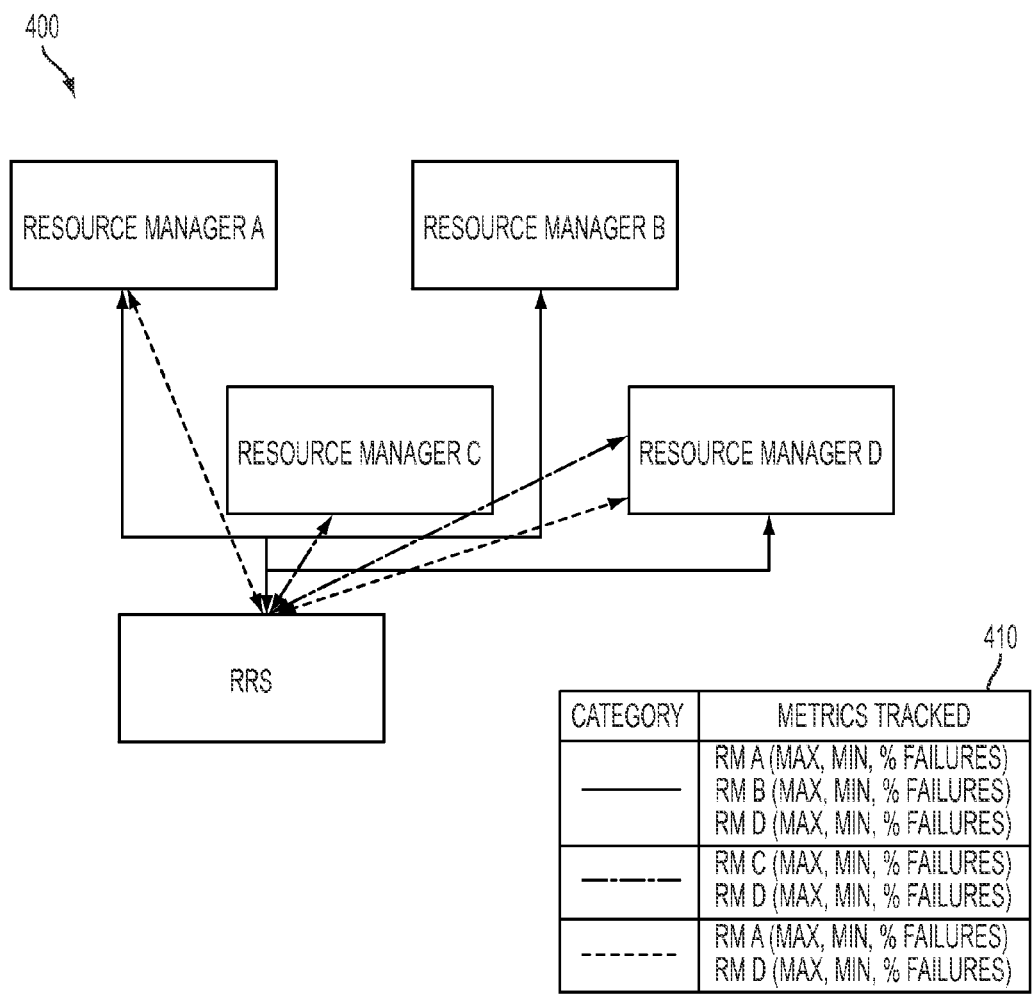
FIG. 4 illustrates an example of a single system of cascaded transactions that illustrates how the transactions can be classified.

With respect to the assignment of transactions to categories (e.g., block 320 in FIG. 3), the number of different transaction classes is potentially extremely large and a model of expected behavior must be constructed for each transaction class. To reduce the number of models required, a new construct "PFA Transaction Class" is implemented. The PFA Transaction Class is constructed using the resource managers 206, 211, 216, 221 which the resource recovery process 225 invokes to process the transactions and the type of request made by resource recovery process 225 to the resource managers 206, 211, 216, 221. FIG. 4 illustrates an example 400 single system of cascaded transactions that illustrates how the transactions can be classified. In the example 400, a list of resource managers is generated by RRS and the type of request is used to divide the transactions into PFA transaction classes, shown as "category" on chart with the associated metric that is tracked as shown in the legend 410.

Figure 5:
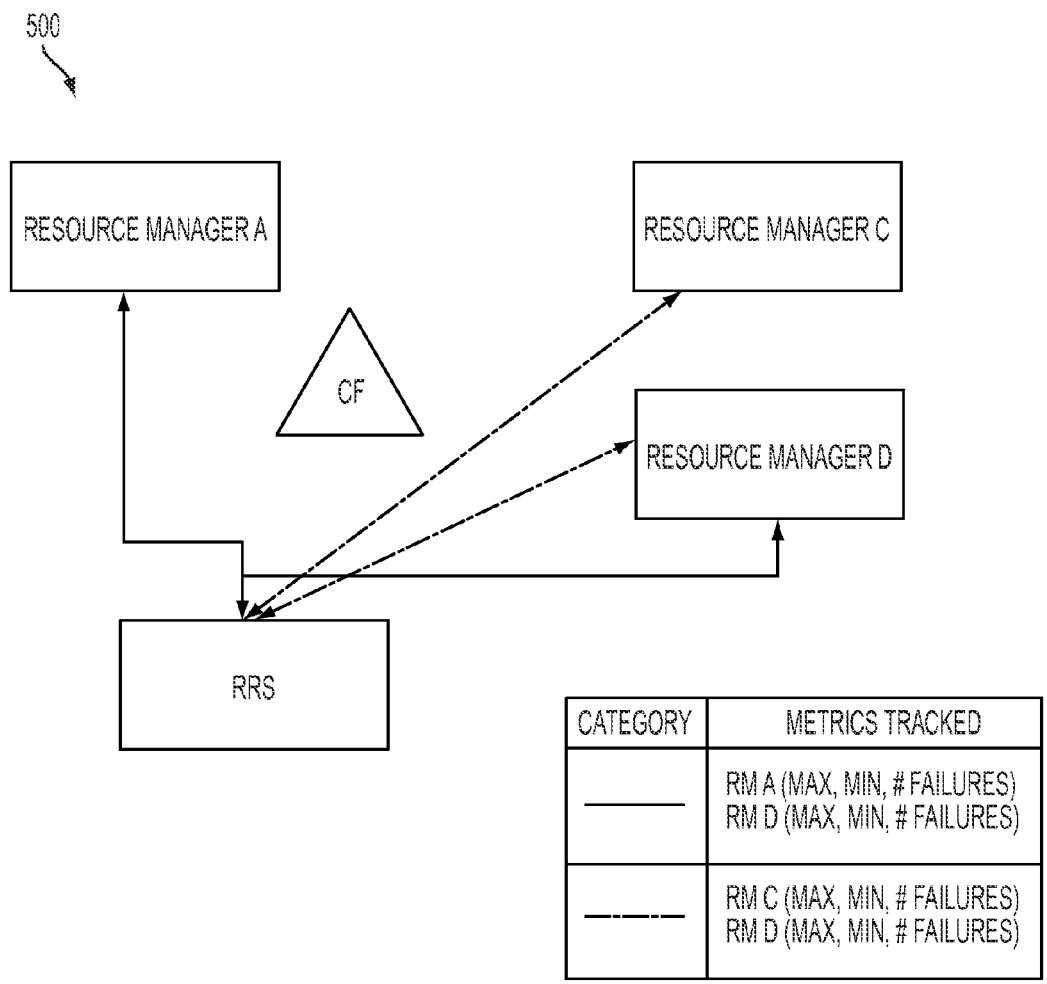
FIG. 5 illustrates an example of multiple systems with cascaded transactions that illustrates how the transactions can be classified.

FIG. 5 illustrates an example 500 of multiple systems with cascaded transactions that illustrates how the transactions can be classified. The transactions will be processed like single system cascaded transactions with one extension. In the example 500, the multiple systems implement z/OS. If the transaction being processed is extracted from the coupling facility, CF, the transactions are grouped into PFA transaction classes depending on the resource managers invoked. A pseudo resource manager for the coupling facility CF is added to the list of resource managers. Each one of the cascaded systems is modeled separately without knowledge of the behavior of RRS on another system.

With respect to selection of simple, low cost metrics, each PFA transaction class is considered. In exemplary embodiments, for each PFA transaction class, four metrics can be collected for each resource manager. This data is captured by the resource recovery process 225 that coordinates two phase commits protocol 230 between multiple resource managers. The four metrics can include, but are not limited to: 1) a longest duration transaction during interval for each resource manager 206, 211, 216, 221; 2) a shortest duration transaction during interval that did not fail (i.e., roll back requested or required) for each resource manager 206, 211, 216, 221; 3) a number of transactions during interval for each resource manager 206, 211, 216, 221; and 4) a number of transactions that are rolled back during interval for each resource manager 206, 211, 216, 221. This information is used to make predictions about the expected behavior of each resource manager for each category of transactions. Exemplary methods for constructing an expected value and variation in the expected value are described herein.

With respect to modeling the behavior of transactions, alternative models are implemented because transactions can have many types of response time distributions (e.g., Poisson, normal, gamma, Pareto, and the like). Instead of modeling the response time distribution, this solution is to model the normal bounds for maximum and minimum time required for a transaction to be processed by a resource manager.

Figure 6:
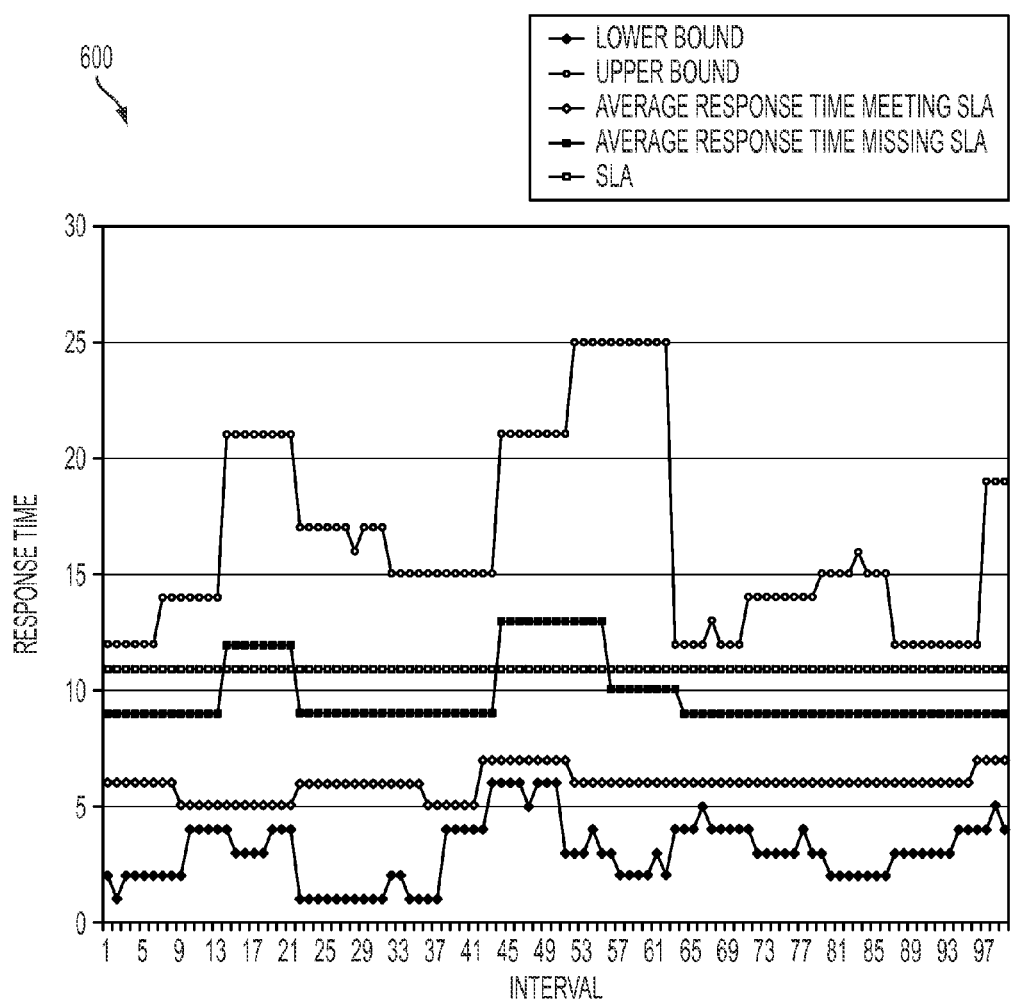
FIG. 6 illustrates an example plot of response time versus interval, illustrating the behavior of a resource manager across many intervals.

In exemplary embodiments, a normal maximum time for a transaction to complete during the interval (upper bound) and the normal shortest time for a transaction to complete during the interval (lower bound) can be considered to follow a normal distribution. FIG. 6 illustrates an example plot 600 of response time versus interval, illustrating the behavior of a resource manager across many intervals. Transactions processed by the resource manager have an expected duration between the upper bound and the lower bound. In the example, the average response time of this transaction could be meeting the Service Level Agreement (SLA) or missing the SLA, which provides little insight into the average response time behavior of the resource manager.

In exemplary embodiments, examination of historical data 240 can show a very high correlation between the current behavior of a system and the behavior 24 hours ago and 7 days ago, for example. Based on the correlation between the behavior 24 hours ago and 7 days ago and present, a good predictor of current behavior is the behavior which happened during those historical intervals.

Therefore, to determine the appropriate expected value for each interval for the upper and lower bound, historical data 240 for the past 24 hours and past 7 days is analyzed. Current modeling paradigms can be implemented to isolate the cluster of metric values representing the behavioral trend for each time period (e.g., 24 hours and 7 days) in the past. Implementing the metric values in the identified cluster, the mean and standard deviation of the minimum and maximum transaction duration can be calculated. Using the mean and standard deviation, the upper bound can be constructed from the maximum duration and the lower bound can be constructed from the minimum duration. The larger duration calculated using the 24 hours or 7 days metrics can be used for the upper bound. The smaller duration calculated using the 24 hours or 7 days metrics can be used for the lower bound.

As such, in exemplary embodiments, the systems and methods described herein can therefore be implemented using metrics to detect storm drains and hung resource managers 206, 211, 216, 221.

In summary, each metric value is analyzed and conclusions can be reached based on observed behavior. In exemplary embodiments, an expected maximum duration during the interval and variation in the maximum duration for each resource manager used by each PFA transaction class is determined. If the actual duration of the transactions for this PFA transaction class using this resource manager exceeds the upper bound control interval constructed using the prediction of the maximum value and the standard deviation, either a message or alert must be issued to notify operations that a resource manager is unresponsive. The message or alert will point to the specific resource manager that is having a problem.

In exemplary embodiments, an expected minimum duration during the interval and variation in minimum duration for each resource manager used by each PFA transaction class is determined. If the actual duration of the transaction for the PFA transaction class using the resource manager is less than the lower bound control interval constructed using the prediction of the minimum value and the standard deviation, either a message or an alert must be issued to notify operations that a resource manager could be experiencing a storm drain. The message or alert will point to the specific resource manager that is having a problem.

In exemplary embodiments, an expected percentage of transactions which are rolled back for each resource manager used by the PFA Transaction Class is determined. If the actual percentage of transactions being rolled back for the PFA transaction class for this specific resource manager exceeds the upper bound control interval during either the entire interval or a fraction of the interval, either a message or an alert must be issued to notify operations that a resource manager could be experiencing a storm drain detected by an excessive percentage of roll backs requested by a specific resource manager.

Technical effects include an expansion of current soft failure identification techniques. The systems and methods described herein detect storm drains and hung resource managers without requiring additional software agents to capture data or change the existing flow of the transaction. The systems and methods described herein: model the behavior of transactions handled by resource managers without knowing the underlying statistical distribution of transaction response times; assign transactions to categories in order to reduce the number of required models to a reasonable number without requiring customer input or looking at the internal details of the transaction; choose simple, low cost metrics to detect storm drains and hung resource managers which will allow for the collection of data without impacting the response time of the transaction; and use the two phase commit coordination software as metric collector in order to detect either a storm drain which is not visible to the resource manager that is experiencing the problem or an unresponsive or hung resource manager. As such, the systems and methods described herein can detect problems without requiring additional instrumentation to the resource manager and without impacting the performance of the transactions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computing system resource recovery method, comprising:
   identifying, by a processing device, a resource manager associated with a computing transaction;
   classifying, by the processing device, the computing transaction to determine a predetermined metric, wherein the computing transaction is assigned to a category;
   measuring, by the processing device, an actual metric of the computing transaction;
   comparing, by the processing device, the predetermined metric to the actual metric to detect abnormal behavior in the computing transaction;
   modeling, by the processing device, the abnormal behavior to determine how the resource manager is affected by the abnormal behavior; and
   constructing, by the processing device, a predictive failure analysis transaction class into which the computing transaction is assigned.

2. The method as claimed in claim 1 wherein the predetermined metric is a longest duration transaction during an interval for the resource manager.

3. The method as claimed in claim 1 wherein the predetermined metric is a number of transactions during an interval for the resource manager.

4. The method as claimed in claim 1, wherein modeling the abnormal behavior comprises:
   capturing historical data; and
   classifying the historical data.

5. A computing system resource recovery method, comprising:
   identifying, by a processing device, a resource manager associated with a computing transaction;
   classifying, by the processing device, the computing transaction to determine a predetermined metric;
   measuring, by the processing device, an actual metric of the computing transaction;
   comparing, by the processing device, the predetermined metric to the actual metric to detect abnormal behavior in the computing transaction; and
   modeling, by the processing device, the abnormal behavior to determine how the resource manager is affected by the abnormal behavior;
   wherein the predetermined metric is selected from the group of: a shortest duration transaction during an interval that did not fail for the resource manager, and a number of transactions that are rolled back during an interval for the resource manager.

6. A computing system resource recovery method, comprising:
   identifying, by a processing device, a resource manager associated with a computing transaction;
   classifying, by the processing device, the computing transaction to determine a predetermined metric;
   measuring, by the processing device, an actual metric of the computing transaction;
   comparing, by the processing device, the predetermined metric to the actual metric to detect abnormal behavior in the computing transaction; and
   modeling, by the processing device, the abnormal behavior to determine how the resource manager is affected by the abnormal behavior;
   wherein the abnormal behavior is selected from the group of: a storm drain, and a hung resource manager.

* * * * *